H. SÜSSMANN.
BURNER FOR UPRIGHT INCANDESCENT GAS LAMPS.
APPLICATION FILED DEC. 23, 1909.
1,025,656.
Patented May 7, 1912.
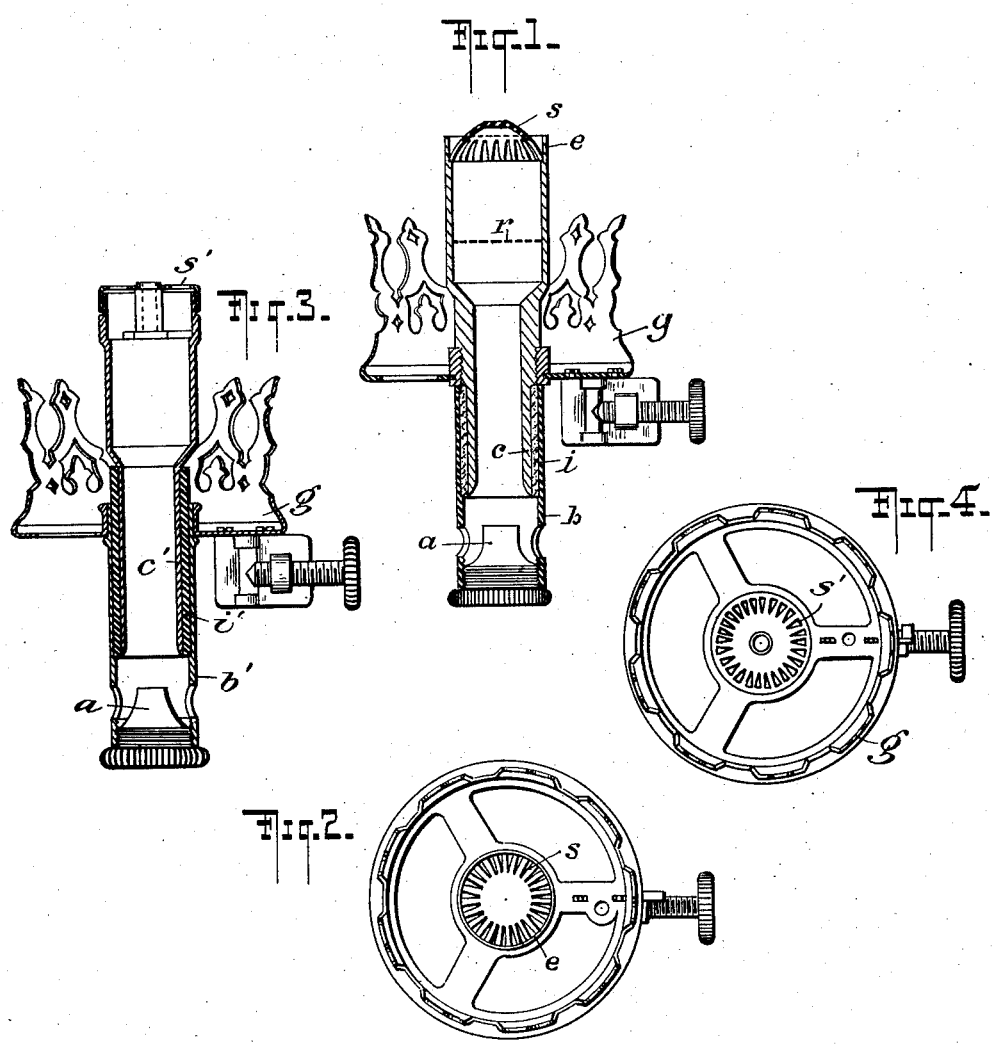

UNITED STATES PATENT OFFICE.

HEINRICH SÜSSMANN, OF BERLIN, GERMANY, ASSIGNOR TO THE FIRM DEUTSCHE GASGLÜHLICHT AKTIENGESELLSCHAFT (AUERGESELLSCHAFT), OF BERLIN, GERMANY.

BURNER FOR UPRIGHT INCANDESCENT GAS-LAMPS.

1,025,656.      Specification of Letters Patent.      Patented May 7, 1912.

Application filed December 23, 1909. Serial No. 534,571.

*To all whom it may concern:*

Be it known that I, HEINRICH SÜSSMANN, a subject of the Emperor of Germany, and a resident of Berlin, Germany, have invented certain new and useful Improvements in Burners for Upright Incandescent Gas-Lamps, of which the following is a specification.

My invention relates to an upright incandescent gas lamp in which the heat conducted to the metal by radiation and conduction is utilized.

The annexed drawings show two embodiments of my invention Figures 1 and 3 being vertical sections and Figs. 2 and 4 the corresponding plan views.

The apertured nozzle tube $b$ (Figs. 1 and 2) is screwed on the nozzle $a$. The nozzle tube carries the top part of the burner, that is, the burner crown, the burner tube $c$ being pushed into the nozzle $b$. The burner tube $c$ is covered on the top by means of a sieve $s$ or an analogous structure. Underneath this sieve another sieve such as the sieve $r$, may be placed, or a plurality of them. The burner tube $c$ does not, as usual, surround the nozzle tube, but is inserted into the nozzle tube $b$. In this way the mixture of gas and air is in direct touch with the burner tube $c$ heated from the flame by radiation and conduction so that all the heat will be utilized in a most economical way. In order to avoid the heat being conducted from the burner tube $c$ to the nozzle tube $b$, it is advisable to make use of an insulation between the two tubes $c$ and $b$, for instance a sleeve or lining $i$ made of a poor conductor of heat. The top part of the burner tube $c$ may be arranged so that the upper portion $e$ of said tube extends upwardly beyond the perforations of the sieve $s$ in order to inclose the same and thus still further improve the reception of heat.

It is of great advantage to avoid any metallic connection between the chimney-supporting gallery $g$ and the tube $c$. For instance a non-conductor of heat may be arranged between the said tube and the gallery or the gallery may be secured to the nozzle tube. This will improve the effect, since the heat conducted down the inside of the burner tube by the flame will not heat the gallery and thus the radiated heat will not be lost. Practical tests have proved that with the use of my invention the gallery remains cold, thus proving conclusively that no heat is lost by radiation. A large amount of heat conducted to the gallery by radiation from the flame and conducted from the chimney is thoroughly utilized for preheating the secondary air.

In Figs. 3 and 4 the nozzle tube $b'$ fixed on the nozzle $a$ carries the gallery $g$ independently of the burner tube $c'$, which fits within the nozzle tube $b'$ and carries a sieve $s'$. Between the tube $c'$ and the tube $b'$ is placed the insulation. By avoiding all contact of the burner tube $c'$ with the gallery all the heat radiating and conducted from the flame through the burner tube $c'$ instead of being lost as usual by radiation from the large surface of the gallery, will, by radiation and conduction from the flame and from the chimney to the gallery, preheat the secondary air admitted from the bottom through the gallery.

I do not desire to restrict myself to the details of construction shown and it is to be understood that various changes may be made within the scope of the claims without departing from the spirit of my invention.

I claim as new and desire to secure by Letters Patent:

1. In a gas burner, a nozzle tube, a burner tube whose lower end extends within the nozzle tube, and a heat insulator within said nozzle tube and between adjacent surfaces of the two tubes.

2. In a gas burner, a nozzle tube, a burner tube whose lower end extends within the nozzle tube, and a heat insulator within said nozzle between adjacent surfaces of the two tubes and secured to the lower part of the burner tube.

3. In a gas burner, a nozzle tube, a burner tube whose lower portion extends within the nozzle tube, a heat insulator within said nozzle tube and between the two tubes and a gallery secured to and carried by said nozzle tube.

Dated, the 9th day of December 1909.

HEINRICH SÜSSMANN.

Witnesses;
   HENRY HASPER,
   WOLDEMAR HAUPT.